United States Patent [19]

Ueda

[11] Patent Number: 4,680,111
[45] Date of Patent: Jul. 14, 1987

[54] SEWAGE TREATMENT EQUIPMENT WITH ACTIVATED SLUDGE PROCESS BEDS

[75] Inventor: Iwao Ueda, 416, Nanba-cho, Matsubara-sagaru, Nishikiyamachi-dori, Shimogyo-ku, Kyoto, Japan

[73] Assignees: Iwao Ueda; Chie Ueda, both of Kyoto, Japan

[21] Appl. No.: 886,923

[22] Filed: Jul. 18, 1986

[30] Foreign Application Priority Data

Jul. 24, 1985 [JP] Japan ............................ 60-164661

[51] Int. Cl.$^4$ ............................................ C02F 3/06
[52] U.S. Cl. .................................. 210/150; 210/615; 210/199; 210/202
[58] Field of Search .................. 210/615–618, 210/150, 151, 508, 620, 195.1, 497.1, 497.01, 494.1, 496.2, 199–202

[56] References Cited

U.S. PATENT DOCUMENTS

| | | | |
|---|---|---|---|
| 3,577,678 | 5/1971 | Burton | 210/615 |
| 4,181,604 | 1/1980 | Onishi et al. | 210/615 |

FOREIGN PATENT DOCUMENTS

| | | | |
|---|---|---|---|
| 55-132689 | 10/1980 | Japan | 210/615 |
| 59-145096 | 8/1984 | Japan | |
| 1363416 | 8/1974 | United Kingdom | 210/150 |

Primary Examiner—Benoit Castel
Attorney, Agent, or Firm—Lowe, Price, Leblanc Becker & Shur

[57] ABSTRACT

A sewage treatment equipment with activated sludge process beds comprising a plurality of treatment tanks arranged in a row, each communicating with an adjacent tank through a passage and being provided with an aeration tank connected with an air in-flow pipe and a plurality of activated sludge process beds disposed vertically above the aeration pipe and in each of which a mesh-like or grid-like outer periphery of a cylindrical core is wrapped with a porous member of a certain thickness and further tightened with tightening belts, characterized in that an outer peripheral area of the cylindrical core is increased tank by tank to give variety to kind of bacteria, bredding ratio between bacterias and distribution thereof.

3 Claims, 4 Drawing Figures

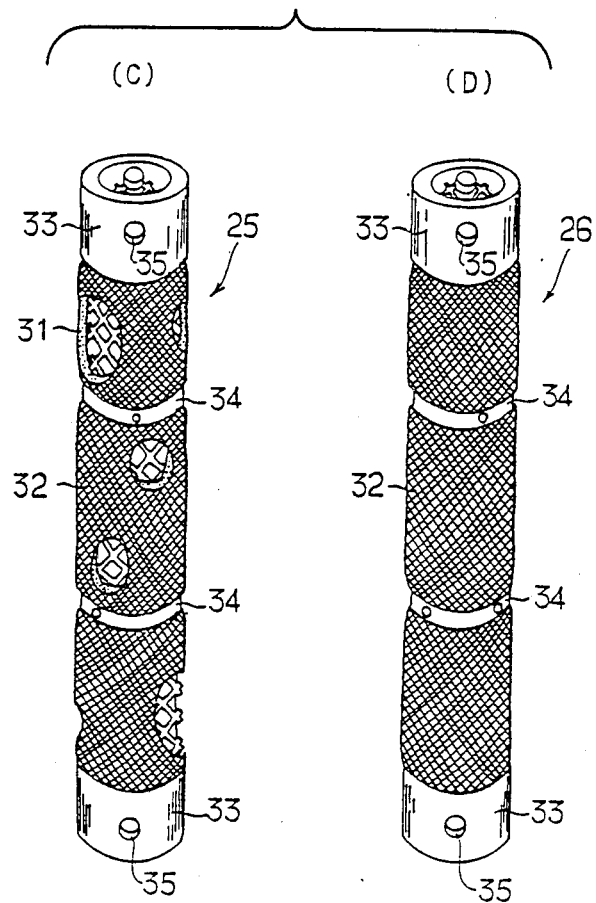

SEWAGE TREATMENT EQUIPMENT WITH ACTIVATED SLUDGE PROCESS BEDS

BACKGROUND OF THE INVENTION

1. Field of the Invention

The present invention relates to an equipment for treating sewage water such as industrial effluent, home life sewage water, etc., and more particularly to a sewage water treatment equipment with activated sludge process beds in which sewage water and air are brought into contact with a carrier (i.e., cultivation bed) on which micro-organisms (i.e., activated sludge) are implanted and cultivated, the activated sludge is bred, and water pollution materials such as BOD, COD are oxidatively decomposed by the activated sludge process beds.

2. Description of Prior Art

Hitherto, an activated sludge process, several modification thereof and tricling filter are conventionally used as one of sewage treatment methods in which such water pollution materials as BOD, COD contained in the sewage water discharged from factories, hotels, homes, etc. are decomposed by micro-organisms. These conventional treatment methods, however, have several disadvantages such as difficulty in daily operation control, necessity of large space for installing the equipment, increase in cost due to a large amount of sludge to be treated and so on.

In addition, a catalytic oxidation method is recently used, wherein micro-organisms are implanted, cultivated and bred on a surface of a catalytic element of a certain design, and the catalytic element is arranged in an aerator to decompose BOD, etc. contained in the sewage water. In such catalytic oxidation method using a catalytic element, however, there exists the same problem as the foregoing conventional methods in the aspect of difficulty in daily operation control, and moreover micro-organisms may sometimes excessively increase to the extent of clogging up the treatment equipment and paralyzing the decomposition of BOD, etc.

In another catalytic oxidation method, in which a corrugated plate of a hard synthetic resin is used as a catalytic element, there exists such problems that it takes long for aerobic bacteria to be implanted and cultivated, that a film formed by bacteria is easy to be peeled due to water flow at the time of aeration or by some physical shock, and that some pieces of the peeled film come to float as scum while the other being precipitated into the bottom of a treatment tank as sludge declining sewage treatment performance thereby.

In a further method for sewage treatment in which a sponge piece is used as a catalytic element floating in an aeration tank, there is a problem that the sponge piece tends to move to one corner of the tank due to water flow at the time of aeration or by wind, eventually inhibiting uniform treatment.

In view of the foregoing problems pertaining to the known methods, the applicant has proposed an activated sludge process bed as disclosed in Japanese laid open Patent Publication (unexamined) No. 59-145096. According to this device, a mesh-like or grid-like outer peripheral surface of a cylindrical core is wrapped with a porous member at a specified thickness to form an activated sludge process bed, and a plurality of such activated sludge process beds are vertically disposed in an aeration tank for sewage treatment. By such arrangement, the device certainly exhibits the following advantages. That is, the activated sludge process beds are not moved by bubbles blown out of an aeration pipe, micro-organism can be implanted and cultivated in short period, and the film of micro-organism is not peeled at all. Furthermore, aerobic bacteria and anaerobic bacteria decompose BOD, COD, etc. further breeding themselves, while other giant micro-organisms are spontaneously bred or come to live at the center portion of the porous member and eat away these aerobic and anaerobic bacteria and autolize them. As a result, it is possible to prevent excessive increase of the aerobic bacteria so as not to produce further sludges. When a plurality of tanks are installed in a row and dissolved oxygen concentration (hereinafter referred to as "DO value") by the aeration is changed tank by tank as well as depending on whether inner periphery or outer periphery of the cylindrical activated sludge process bed, it is expected to perform the sewage treatment efficiently at a high BOD/COD elimination rate by means of respective beds, each having adequate breeding layers formed of aerobic and anaerobic bacteria while balancing nutritively the air, nitrogen and phosphorus they need according to the progress of the treatment.

The sewage treatment method disclosed in the above Publication No. 59-145096 indeed has various advantages as described above, but at the same time following disadvantages are to be pointed out, that is, as a matter of fact, from the viewpoint of operation control, it is quite difficult to control aerobic and anaerobic bacteria accurately so as to keep a correct and desired DO value tank by tank as well as inside and outside of each tank by merely changing the amount of air supplied from the aeration pipe since such other factor as water flow gives influence to the control. Besides, daily operation control in the treatment will require much labor. Accordingly, since the accurate control of DO value is difficult, it will be further difficult to eliminate BOD and COD at high efficiency. In particular, when BOD and/or COD is at lower level, the treatment will be difficult all the more.

SUMMARY OF THE INVENTION

Accordingly, it is an object of the present invention to provide an improved sewage treatment equipment with activated sludge process beds in which daily operation control is easy and simple while sewage treatment is performed efficiently at a high elimination rate whether BOD and COD are at high level or not.

In order to accomplish the foregoing object, according to the present invention, the activated sludge process equipment disclosed in the above-mentioned Publication No. 59-145096 is improved by appropriately changing designs of the activated sludge process beds disposed in treatment tanks arranged in a row tank by tank.

That is, the foregoing object is accomplished by providing a sewage treatment equipment with activated sludge process beds in which a plurality of treatment tanks are arranged in a row each communicating with an adjacent tank through a channel, and each of the treatment tanks comprises a plurality of activated sludge process beds disposed vertically above an aeration pipe which is connected with an air in-flow pipe and disposed at the bottom of each tank, each of the activated sludge process beds comprising a cylindrical core of which mesh-like or grid-like outer periphery is wrapped with a porous member of a certain thickness and tightened by tightening means, characterized in that an outer peripheral area of the cylindrical core wrapped with the porous member in each activated sludge process bed is increased tank by tank according to disposition of the tanks so as to give variety to kind of bacteria, breeding ratio between aerobic bacteria and anaerobic bacteria and distribution thereof tank by tank in order.

By the foregoing arrangement, when some air is supplied to the aeration pipe disposed at the bottom of each tank through the air in-flow pipe, the air is blown out into the sewage water in the form of bubbles through a lot of slits formed on the surface of the aeration pipe, and the sewage water containing oxygen of the air dissolved thereinto comes in contact with the activated sludge process beds above the aeration pipe. Thus the water pollution materials such as BOD, COD are decomposed by aerobic and anaerobic bacteria both implanted and cultivated on the activated sludge process beds. Meanwhile, these aerobic and anaerobic bacteria are further bred utilizing a part of energy obtained at the time of decomposition. In this connection, since the activated sludge process bed is cylindrical, there is a difference of the DO value between the outside and the inside of the cylinder, and aerobic bacteria are bred a lot on the outer peripheral surface of the bed, while anaerobic bacteria are bred on the inner peripheral surface of the bed. Then, giant micro-organisms such as Zooglea bacteria, Sphaerotilus, Nematoda or water mites are spontaneously bred or come to live at the center portion of the porous member of the activated sludge process bed and eat away both aerobic and anaerobic bacterias to autolyze them. Therefore, excessive increase or breeding of aerobic bacteria to produce excessive sludge is successfully prevented.

Since a plurality of sewage treatment tanks are installed in a row, one tank being communicated with the other tank adjacent through a channel, when DO value is changed by reducing the air supply from the aeration pipe to each tank in order, there is a variation tank by tank in the aspects of kind of bacteria, ratio of aerobic bacteria to anaerobic bacteria, distribution of giant micro-organisms, etc. cultivated in each bed. Thus, it becomes possible to utilize characteristics of respective micro-organism according to process of treatment, i.e., excellent performance of aerobic bacteria exhibited in the treatment of BOD, COD, etc. being at high level and that of anaerobic bacteria in the treatment of BOD, etc. being at low level as well as in the decomposition of nitrogen.

However, the foregoing improvement in the treatment efficiency depends largely on accurate control of DO value. From this point of view in the case of each activated sludge process bed used in a sewage treatment equipment according to the present invention, variety is given to the amount of flow of the sewage water of which DO value is increased depending on the outside or inside of the cylinder by changing physical environment of the bed, i.e., cylindrical area wrapped with the porous member tank by tank in order. As a result, the control of BO value is quite accurate and easy both inside and outside of the cylindrical bed, and constant and efficient sewage treatment performance is exhibited. Thus, when the area of the cylinder wrapped with the porous member is changed tank by tank according to the arrangement thereof, it is possible to give variety tank by tank to kind of bacteria, ratio of aerobic bacteria to anaerobic bacteria, etc. composing the activated sludge.

Since the above-described functions are exhibited by the sewage treatment equipment according to the present invention, it is possible to control DO value appropriately keeping the nutritive balance in respective tanks disposed in a row, and accordingly the most suitable breeding layers of bacteria are constantly formed according to each process of the treatment. As a result, even when the amount of air supply from the aeration pipe is kept as it was set at the starting of operation a quite efficient sewage treatment is performed by the treatment equipment as a whole in spite of variation in BOD and COD in the sewage water, and it is possible to treat the sewage water always at high efficiency. Besides, the day-to-day operation control is easy and it does not require much labor.

BRIEF DESCRIPTION OF THE DRAWINGS

Other objects and features of the present invention will become apparent in the course of the following description in conjunction with the accompanying drawings wherein:

FIGS. 2-1 and 2-2 are persepective views of the activated sludge process beds of various types used in the equipment of FIG. 1.

DESCRIPTION OF THE PREFERRED EMBODIMENT

Referring now to the accompanying drawings, a preferred embodiment of the present invention is described hereinafter.

Figure 1:
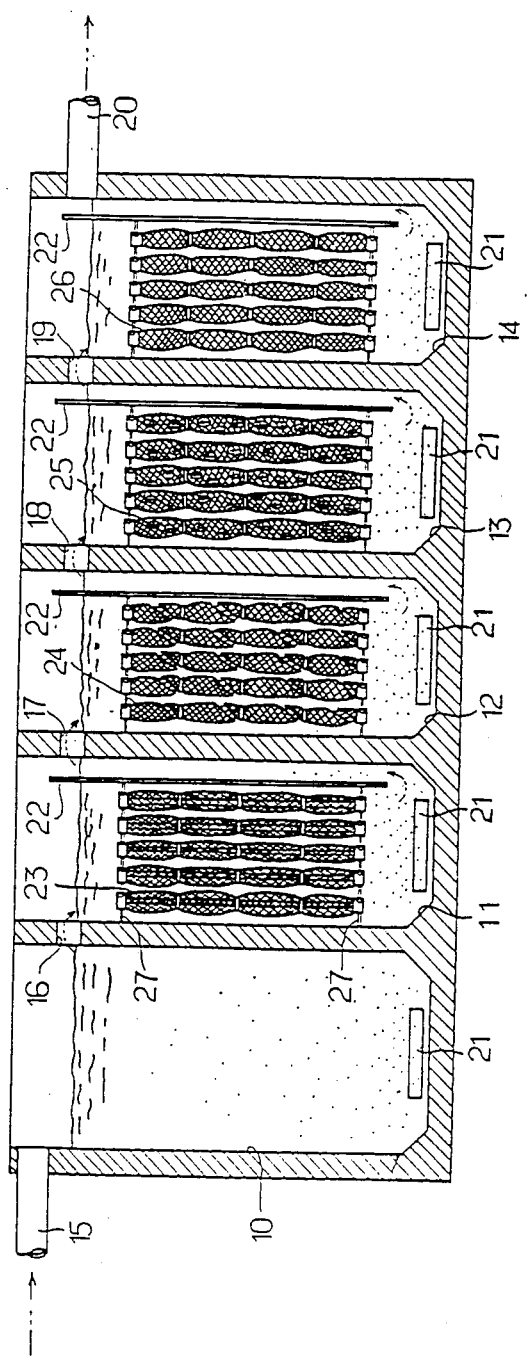
FIG. 1 is a sectional front view of a sewage treatment equipment with activated sludge process beds embodying the present invention.

In FIG. 1 showing an embodiment of the present invention wherein piping and pump, etc. are omitted, reference numeral 10 is a flow control tank in connection with which a first sewage treatment tank 11, a second sewage treatment tank 12, a third sewage treatment tank 13 and a fourth sewage treatment tank 14 are disposed side by side. This flow control tank is equipped with a sewage water in-flow pipe 15 on the upper part thereof. Passages 16, 17, 18, 19 are disposed on the upper parts of bulkheads and between the flow control tank 10 and the first tank 11 as well as between the tanks adjacent each other. The fourth tank 14 is equipped with a treated water discharge pipe 20 on the upper part thereof. While an aeration pipe 21 connected to an air-inflow pipe (not shown) is disposed at the bottom part of each tank. A dashboard 22 is also disposed in each tank. A plurality of activated sludge process beds 23, 24, 25, 26 are vertically disposed above each aeration pipe 21 with their upper and lower ends supported by support rods 27.

Figures 1, 2:
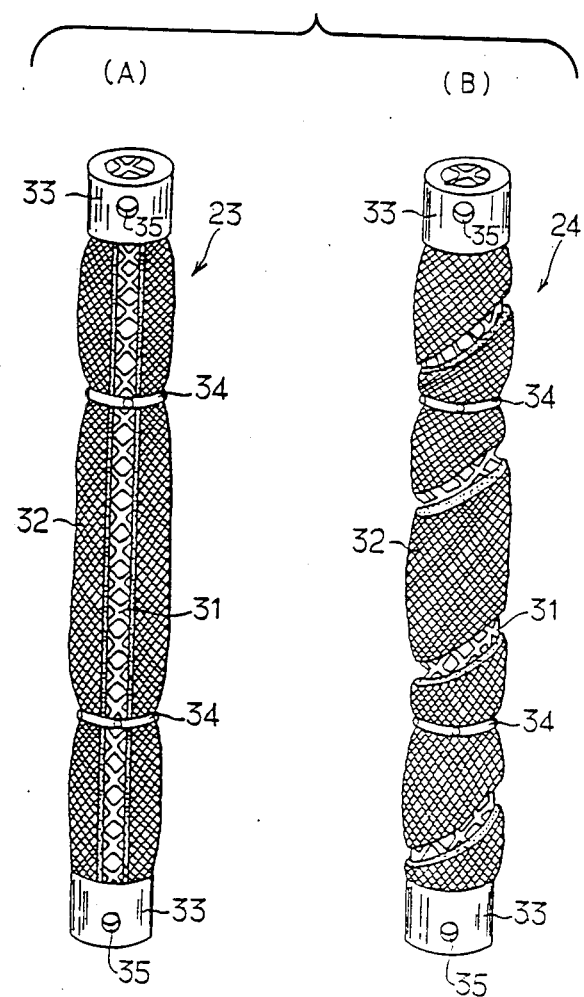
Figure 3:
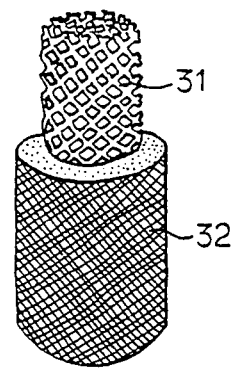
FIG. 3 is a partially cutout enlarged perspective view of an activated sludge process bed.

Each activated sludge process bed, of which partially cutout enlarged view is shown in FIG. 3., comprises a cylindrical core 31 of a hard synthetic resin resistant to corrosion for a long period of immersion having a mesh-like or grid-like peripheral surface, a porous member 32 with which this cylindrical core 31 is wrapped at a certain thickness, i.e., 15–20 mm in thickness, tightening rings 33 for tightening upper and lower parts of each bed as shown in FIGS. 2-1 and 2-2, and tightening belts 34 for tightening the porous member 32 to the cylindrical core 31 at several portions. In addition, numeral 35 is holes perforated on each tightening ring 33 to insert support rods 27 for supporting the beds (see FIG. 1). The porous member 32 is formed of a lot of corrosion resistant vinylidene chloride yarns intertwisted one another or other spongy, mesh-like or fibrous synthetic resin. These activated sludge process beds 23, 24, 25, 26 have different forms respectively tank by tank as illustrated in FIGS. 2-1 and 2-2. That is, in the case of the activated sludge process bed 23 in FIG. 2-1 (A) to be disposed in the tank 11, the porous member 32 is partially cut out longitudinally by about one third ($\frac{1}{3}$) of the outer periphery thereof and the cylindrical core 31 is exposed as much. In the case of the activated sludge process bed 24 in FIG. 2-1 (B) to be disposed in the tank 12, the porous member 32 is cut out at a certain width in the form of a spiral and the cylindrical core 31 is partially exposed. In the case of the activated sludge process bed in FIG. 2-2 (C) to be disposed in the tank 13, the porous member 32 is irregularly cut out at plural portions in the form of a circle and the cylindrical core 31 is partially exposed. In each of these activated sludge process beds, an area where the cylindrical core 31 is partially exposed by cutout of the porous member 32 is reduced one by one in order of (A), (B) and (C). In other words, a covered area of the outer periphery of the cylinder with the porous member 32 becomes larger bed by bed in order. Then in the activated sludge process bed to be disposed in the tank 14, all surface of the cylindrical core 31 is covered with the porous member 32 as shown in FIG. 2-2 (D).

With above described sewage treatment equipment having activated sludge process beds, sewage treatment is performed in the following manner.

Sewage water is brought into the flow control tank 10 through the sewage water in-flow pipe 15, and after filling and overflowing the tank 10, enters into the first tank 11 and receives strong aeration from the aeration pipe 21 to increase DO value thereof, and at the same time the water is circulated by a pump or the like (not shown). In this process, aerobic bacteria are implanted and cultivated at space portions on the outer periphery of the activated sludge process bed 23, while anaerobic bacteria are implanted and cultivated at space portions on the inner periphery thereof. These bacteria decompose water pollution materials such as BOD, COD, etc. contained in the sewage water and further breed themselves utilizing a part of energy obtained at the time of decomposition. In the meantime, giant micro-organisms such as Zooglea bacteria, Sphaerotilus, Nematoda or water mites are spontaneously bred or come to live at the center portion of the porous member 32 of the bed 23 and eat away excess aerobic and anaerobic bacteria to autolyze them. In this way, in the activated sludge process bed, a thickness of a film formed of aerobic and anaerobic bacteria is substantially kept constant, and sewage water is treated without producing excessive sludges. In addition, in the foregoing process, since the giant micro-organisms eat away the aerobic and anaerobic bacteria starting from the center portion toward the outer surface of the porous member 32, aged or used bacteria of which oxidative decomposition performance is declined are eliminated in order, and accordingly fresh and active aerobic and anaerobic bacteria are always cultivated and bred on both outer and inner surfaces of the cylinder, improving the treatment performance thereby.

The sewage water treated in the first tank 11 as above described is then flown into the second tank 12 through the passage 17 partitioned by the dashboard 22, where almost the same treatment as in the first tank 11 is applied to the water. After being further treated in the third and fourth tanks 13, 14 in the same manner, the finally treated water is discharged from the fourth tank 14 by way of a discharging pipe 20.

In the treatment process mentioned above, the amount of air supply from each aeration pipe 21 to each tank is reduced or throttled tank by tank in order so that DO value in each tank is variably controlled. In addition, since the shape and area of the exposed portions of each cylindrical core 31 are different tank by tank, DO value varies further between the outside and the inside of each activated sludge bed. Thus, there is a variation tank by tank in the aspects of kind of bacteria, ratio between the aerobic and anaerobic bacteria, distribution of giant micro-organism, etc. cultivated in each bed 23 to 26 disposed in the first to fourth tanks 11 to 14 according to the variation of DO value inside and outside of each bed. The ratio of aerobic bacteria to anaerobic bacteria is, for example, 80% to 20% in the case of the activated sludge bed 23 disposed in the first tank 11, 60% to 40% in the case of the bed 24 disposed in the second tank 12, 50% to 50% in the case of the bed 25 disposed in the third tank 13, and 40% to 60% in the case of the bed 26 disposed in the fourth tank 14. In this way, high BOD in the sewage water is mainly treated in the first tank 11, residual BOD and COD in the second tank 12, still residual BOD, COD and nitrogen etc. in the third tank 13, and further remaining low BOD, COD are mainly treated in the fourth tank 14 together with the elimination of nitrogen.

Following table shows results of treatment actually carried out by using the equipment of the foregoing embodiment under the operating conditions of 1,000 m$^3$/day in quantity of sewage water, 1,000 ppm in BOD density, 700 ppm in COD density, and 700 m$^3$ (=175 m$^3 \times 4$ tanks) in total volume of tanks.

TABLE

| Sewage treatment tank | Water quality index | In-flow density (ppm) | Out-flow density (ppm) | Elimination (%) | Volume Load (kg/m$^3$ · day) | Necessary amount of air (m$^3$/min) |
|---|---|---|---|---|---|---|
| 1st tank | BOD | 1,000 | 200 | 80 | 4.57 | 33.6 |
|  | COD | 700 | 175 | 75 | 3.0 | 22.1 |
| 2nd tank | BOD | 200 | 50 | 75 | 0.86 | 6.3 |
|  | COD | 175 | 52.5 | 70 | 0.7 | 5.15 |
| 3rd tank | BOD | 50 | 17.5 | 65 | 0.186 | 1.365 |
|  | COD | 52.5 | 18.375 | 65 | 0.915 | 1.44 |
| 4th tank | BOD | 17.5 | 8.75 | 50 | 0.05 | 0.735 |
|  | COD | 18.375 | 9.187 | 50 | 0.05 | 0.77 |

The scope of the present invention is not limited to the embodiment described above and shown in the drawings but includes several modifications. For example, the number of treatment tanks is not always restricted to four but can be any other number not less than two. Shape and disposition of each tank is not restricted to those illustrated, either, but can be circular, for example. Furthermore, as for the shape of the activated sludge process bed, it can be polygonal in section other than circular so far as the bed is tubular. It is also preferred that the exposed portions of the cylindrical core formed by cutting out the porous member or by partially wrapping the core with the porous member in the case of the above embodiment, are formed into any other shape than illustrated ones so far as the exposed portions vary tank by tank in order.

Further modifications will be possible in the method of fitting porous member to the cylindrical core or disposing vertically the activated sludge process beds in the tanks.

What is claimed is:

1. In a sewage treatment equipment with activated sludge process beds in which a plurality of treatment tanks are arranged in a row each communicating with an adjacent tank through a passage, and each of the treatment tanks comprises a plurality of activated sludge process beds disposed vertically above an aeration pipe which is connected with an air in-flow pipe and disposed at the bottom of each tank, each of the activated sludge process beds comprising a cylindrical core composed of a hard synthetic resin resistant to corrosion over a long period of immersion in sewage water, said cylindrical core being wrapped with a porous member, said core being tightened by tightening means, the improvement comprising: an outer peripheral area of the cylindrical core wrapped with the porous member in each activated sludge process bed being increased tank by tank according to disposition of the tanks so as to give variety to kinds of bacteria, breeding ratio between aerobic bacteria and anaerobic bacteria and distribution thereof tank by tank in order.

2. A sewage treatment equipment with activated sludge beds as claimed in claim 1, wherein the porous member of each bed is formed of a lot of vinylidene chloride yarns intertwisted with one another.

3. The improvement of claim 1, wherein, within said plurality of treatment tanks, the ratio of aerobic bacteria to anaerobic bacteria in the activated sludge bed of a first tank is approximately 80% to 20%, in a second tank is approximately 50% to 50% and a third tank is approximately 40% to 60%.

* * * * *